US009642183B2

(12) United States Patent
Montag

(10) Patent No.: US 9,642,183 B2
(45) Date of Patent: May 2, 2017

(54) INFORMATION HANDLING SYSTEM PROXIMITY-BASED WIRELESS INTERFACE CONNECTIVITY

(75) Inventor: Bruce C. Montag, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 355 days.

(21) Appl. No.: 13/600,315

(22) Filed: Aug. 31, 2012

(65) Prior Publication Data

US 2014/0064258 A1  Mar. 6, 2014

(51) Int. Cl.
  *H04W 4/00* (2009.01)
  *H04W 84/12* (2009.01)
(52) U.S. Cl.
  CPC .................... *H04W 84/12* (2013.01)
(58) Field of Classification Search
  CPC ............ H04W 84/12; H04W 52/0229; H04W 52/0261; H04W 52/0274; H04W 88/06
  USPC ............... 370/338, 310, 328; 455/422.1, 460
  See application file for complete search history.

(56) References Cited

U.S. PATENT DOCUMENTS

| 6,067,076 A | 5/2000 | Hocker et al. | |
|---|---|---|---|
| 6,366,957 B1 * | 4/2002 | Na | G06F 1/266 709/229 |
| 8,019,883 B1 | 9/2011 | Margulis | |
| 8,180,328 B2 * | 5/2012 | Van De Groenendaal | H04L 63/102 455/406 |
| 8,261,108 B2 * | 9/2012 | Mehta | G06F 1/3203 455/134 |
| 8,326,231 B1 * | 12/2012 | Davis | H04W 52/0274 370/311 |
| 8,533,506 B2 * | 9/2013 | Clark | H04W 52/0235 710/1 |
| 8,547,887 B2 * | 10/2013 | Olson | H04M 1/725 370/311 |
| 8,724,604 B2 * | 5/2014 | Yang | H04L 45/60 370/338 |
| 2003/0221036 A1 * | 11/2003 | Konetski | G06F 1/1632 710/303 |
| 2005/0012747 A1 * | 1/2005 | Sauber | G06F 3/14 345/501 |
| 2006/0015621 A1 * | 1/2006 | Quinn | 709/227 |
| 2006/0044314 A1 * | 3/2006 | Pandita | G06Q 10/00 345/502 |
| 2006/0069496 A1 * | 3/2006 | Feldman | G08G 1/0104 701/117 |
| 2006/0106840 A1 * | 5/2006 | Rooney | H04L 67/26 |

(Continued)

*Primary Examiner* — Khaled Kassim
*Assistant Examiner* — Berhanu Belete
(74) *Attorney, Agent, or Firm* — Terrile, Cannatti, Chambers & Holland, LLP; Robert W. Holland

(57) ABSTRACT

An information handling system communicates through plural wireless interfaces with plural external wireless devices by automatically selecting associated external wireless devices based upon the proximity of the information handling system to the devices. Positioning of wireless devices is stored in memory to allow a wireless transceiver of the information handling system to power down until within range of a wireless device of interest. For example, an information handling system interfaced with a WLAN through a wireless access point retrieves a wireless device map with wireless devices of one or more work zones located in the WLAN area, each work zone having a set of one or more wireless peripherals in connectivity stations.

16 Claims, 3 Drawing Sheets

(56) References Cited

U.S. PATENT DOCUMENTS

| | | | |
|---|---|---|---|
| 2006/0114883 A1* | 6/2006 | Mehta et al. | 370/352 |
| 2006/0233191 A1* | 10/2006 | Pirzada | H04W 88/00 370/463 |
| 2007/0073908 A1* | 3/2007 | Gormley | G05B 19/0421 710/8 |
| 2007/0073944 A1* | 3/2007 | Gormley | B60R 16/0231 710/72 |
| 2007/0275735 A1* | 11/2007 | Estevez | G01C 21/20 455/457 |
| 2008/0002523 A1* | 1/2008 | Podladchikov | G01V 1/28 367/49 |
| 2008/0082838 A1* | 4/2008 | Achariyakosol | G06F 3/165 713/300 |
| 2008/0095097 A1* | 4/2008 | Mehta | H04W 48/04 370/328 |
| 2008/0146265 A1 | 6/2008 | Valavi | |
| 2008/0219227 A1* | 9/2008 | Michaelis | H04L 12/189 370/338 |
| 2008/0280559 A1* | 11/2008 | Dandekar | H04W 12/04 455/41.2 |
| 2008/0297520 A1* | 12/2008 | Montag | 345/501 |
| 2009/0033287 A1* | 2/2009 | Nikazm | G06F 1/263 320/137 |
| 2009/0168676 A1* | 7/2009 | Olson | H04M 1/725 370/311 |
| 2009/0284416 A1* | 11/2009 | Quinn | H01Q 1/2258 342/377 |
| 2009/0322767 A1* | 12/2009 | Douglas | G06F 3/1431 345/520 |
| 2010/0035547 A1* | 2/2010 | Miyauchi et al. | 455/41.2 |
| 2010/0045441 A1* | 2/2010 | Hirsch | H04B 5/0012 340/10.1 |
| 2010/0057969 A1 | 3/2010 | Meiri et al. | |
| 2010/0068997 A1* | 3/2010 | Dunko | H04W 4/001 455/41.1 |
| 2010/0115144 A1* | 5/2010 | Dubs | G06F 1/3287 710/8 |
| 2010/0182239 A1* | 7/2010 | Wang | G06F 3/0231 345/168 |
| 2010/0203833 A1 | 8/2010 | Dorsey | |
| 2010/0222000 A1* | 9/2010 | Sauer et al. | 455/41.2 |
| 2010/0223026 A1* | 9/2010 | Witte | G06F 1/1677 702/150 |
| 2010/0250876 A1* | 9/2010 | Wang | G06F 12/0607 711/157 |
| 2010/0284316 A1* | 11/2010 | Sampathkumar | H04W 52/0216 370/311 |
| 2011/0035042 A1* | 2/2011 | Henrichsen | G06Q 10/06 700/110 |
| 2011/0038292 A1* | 2/2011 | Salomone | H04W 52/0229 370/311 |
| 2011/0070829 A1* | 3/2011 | Griffin | H04B 5/02 455/41.1 |
| 2011/0167285 A1* | 7/2011 | Mehta | G06F 1/3203 713/320 |
| 2011/0197147 A1* | 8/2011 | Fai | G06F 1/1639 715/753 |
| 2011/0243020 A1* | 10/2011 | Ponnuswamy | H04L 41/22 370/252 |
| 2011/0264743 A1 | 10/2011 | Baumert et al. | |
| 2011/0275316 A1* | 11/2011 | Suumaki | G06K 7/10237 455/41.1 |
| 2011/0310106 A1* | 12/2011 | Montag | 345/501 |
| 2011/0320293 A1* | 12/2011 | Khan | G06Q 20/0457 705/16 |
| 2012/0079567 A1* | 3/2012 | Van De Groenendaal | 726/4 |
| 2012/0084551 A1* | 4/2012 | Cheng et al. | 713/2 |
| 2012/0198263 A1* | 8/2012 | Berke | G06F 1/3206 713/340 |
| 2012/0246239 A1* | 9/2012 | Rehmann | G06Q 10/107 709/206 |
| 2012/0254356 A1* | 10/2012 | Kashiwagi | G06Q 30/0241 709/217 |
| 2012/0330849 A1* | 12/2012 | Nielsen | G06Q 10/06 705/301 |
| 2013/0031377 A1* | 1/2013 | Sultenfuss | G06F 1/1632 713/300 |
| 2013/0125031 A1* | 5/2013 | Calica | G06F 3/0484 715/764 |
| 2013/0258582 A1* | 10/2013 | Shelnutt | G06F 1/206 361/679.48 |
| 2013/0260757 A1* | 10/2013 | Deivasigamani | H04W 24/00 455/435.3 |
| 2013/0265915 A1* | 10/2013 | Choi | H04B 1/56 370/280 |
| 2013/0268628 A1* | 10/2013 | Zhu | H04W 52/04 709/217 |
| 2014/0364139 A1* | 12/2014 | Lipman | H04L 67/16 455/456.1 |

* cited by examiner

INFORMATION HANDLING SYSTEM PROXIMITY-BASED WIRELESS INTERFACE CONNECTIVITY

BACKGROUND OF THE INVENTION

Field of the Invention

The present invention relates in general to the field of information handling system wireless interfaces, and more particularly to information handling system proximity-based wireless interface connectivity.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems communicate wirelessly with a variety of resources, such as wireless network access points to communicate with local area networks and wireless peripherals to input and output information. Many wireless interfaces communicate information in the place of wired interfaces by supporting wired interface protocols, such as USB 3, GbE, PCIe, DisplayPort and HDMI, as well as traditional IP network traffic. By supporting wired interface protocols, wireless interfaces enable information handling system interactions with peripheral devices that use wired interfaces but without using cables. In essence, a working space for an end user becomes a wireless ecosystem that allows an end user to wirelessly interface a mobile information handling system with peripheral devices, and with other information handling systems, thus providing greater convenience for the end user relative to conventional wired docking stations or via wired cabling. Rather than physically connecting a portable information handling system with a docking station having physical connections with peripherals, or wired connections to peripherals themselves, wireless transceivers of the information handling system and the peripherals directly interface to wirelessly exchange peripheral information. An end user can create a cable-free wireless ecosystem of mobile computing devices and peripherals, such as monitors, high definition television, projectors, storage, printers, speakers, tablet information handling systems, laptop information handling systems, smartphones, etc . . .

Tri-Band Wi-Fi is an industry attempt to standardize wireless peripheral communication under I.E.E.E. 802.11ad to support gigabit wireless communication rates. Tri-Band Wi-Fi uses three wireless bands to communicate information: 2.4 Ghz, 5.0 Ghz and 60 Ghz. The 2.4 Ghz and 5.0 Ghz bands are typically used to support wireless local area network (WLAN) connections, such as for Internet access. The 60 Ghz band, also known as millimeter wave, is typically used to transport multi-gigabit wired protocols and IP connections with high bandwidth, but limited range, such as approximately 10 meters. For example, millimeter wave interfaces have adequate bandwidth to communicate display information wirelessly. While interfaced with Tri-Band Wi-Fi, an end user might also use other wireless technologies to interface with peripheral devices, such as Bluetooth to interface with a keyboard or mouse.

One difficulty with Tri-Band Wi-Fi and similar wireless interfaces is that an end user in a wireless ecosystem can face a baffling number of wireless connection choices. Traditionally, Wi-Fi has been used to connect an information handling system with the internet or a local network via a single connection to an access point. Typically, this type of Wi-Fi connection and connections through additional types of wireless interfaces are manually set up by an end user through a discovery and pairing process. Emerging capabilities such as Wi-Fi Direct now enable multiple concurrent wireless connections to mobile devices. Rather than having a single connection to an access point, mobile devices may now have several simultaneous wireless connections, such as to a printer, a projector, and other mobile devices, in addition to the connection to the internet or local area network. The wireless transceiver(s) of an information handling system displays a list of wireless devices within range, such as through an operating system window, and the end user selects the desired device(s) from the list to initiate or authenticate a connection. In practice, an end user within this wireless ecosystem desires to establish connectivity primarily to devices which are nearby, in addition to the access point connection. As wireless devices continue to proliferate, the list of available devices within Wi-Fi range of an information handling system can become un-navigable and unmanageable for the end user.

SUMMARY OF THE INVENTION

Therefore a need has arisen for a system and method which supports automated discovery and connection by an information handling system to wireless devices based upon proximity.

In accordance with the present invention, a system and method are provided which substantially reduce the disadvantages and problems associated with previous methods and systems for connecting wireless devices to an information handling system. An information handling system establishes wireless interfaces with one or more wireless devices based upon proximity to the wireless devices. Nearby wireless devices are paired based upon proximity and function to provide automated wireless proximity-based connectivity for an information handling system.

More specifically, an information handling system processes information with a processor and memory disposed in a portable housing. A wireless communication subsystem disposed in the housing includes plural wireless transceivers that communicate with wireless devices through plural wireless bands, such as Bluetooth and 802.11(b, n and ad) compliant transceivers that communicate through a 2.4 Ghz, 5.0 Ghz and 60 Ghz band. The wireless communication subsystem selectively interfaces with each of plural devices through one or more bands based upon the proximity of nearby wireless devices to the information handling system.

Proximity is determined from either a) the relative calculated physical position of the information handling system, such as determined by GPS measurement or location service determination via nearby access points, or b) by the relative received signal strength versus transmitted power of a wireless interface on the information handling system such as Wi-Fi or Bluetooth, or c) by physical contact between devices such as through an NFC interface. A visual device map generated at an information handling system provides a view of relative positional information (e.g. proximity) for nearby wireless devices and pairs these wireless devices with the information handling system based on user defined policy. By generating a visual device map of nearby wireless devices based on proximity and connectivity policy, the communication subsystem provides an end user with a streamlined method to identify and connect to only intended devices, similar to a wired connectivity model. The present invention provides a number of important technical advantages. One example of an important technical advantage is that an end user is presented with nearby wireless connections based on proximity to enable usage model similar to that of a wired connection usage model. If the end user enters a work space with the information handling system, then network and peripheral wireless interfaces of the work space provide automated pairing per connectivity policy so that the end user seamlessly integrates with a selected of plural wireless ecosystems within the work space. Device discovery and connection initiation based on detected proximity through a first wireless band can then be used to establish additional wireless connections over other wireless bands between the discovered devices and the information handling system. In the event that the end user's physical location based upon GPS or other methods indicates that the relative distance between the information handling system and paired devices is too great to enable wireless connectivity over specific wireless bands, then the information handling system can conserve power by shutting down the transceiver of that wireless band, and activate the specific wireless band when the physical location is within wireless connectivity range.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

A wireless ecosystem is defined by associating wireless devices over plural wireless bands with each other and automatically interfacing an information handling system with the wireless devices when within a predetermined proximity. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, a tablet, a monitor, or any other suitable device and may vary in size, shape, performance, functionality, and price. The information handling system may include random access memory (RAM), one or more processing resources such as a central processing unit (CPU) or hardware or software control logic. ROM, and/or other types of nonvolatile memory. Additional components of the information handling system may include one or more disk drives, one or more network ports for communicating with external devices as well as various input and output (I/O) devices, such as a keyboard, a mouse, and a display surface. The information handling system may also include one or more buses operable to transmit communications between the various hardware components.

Figure 1:
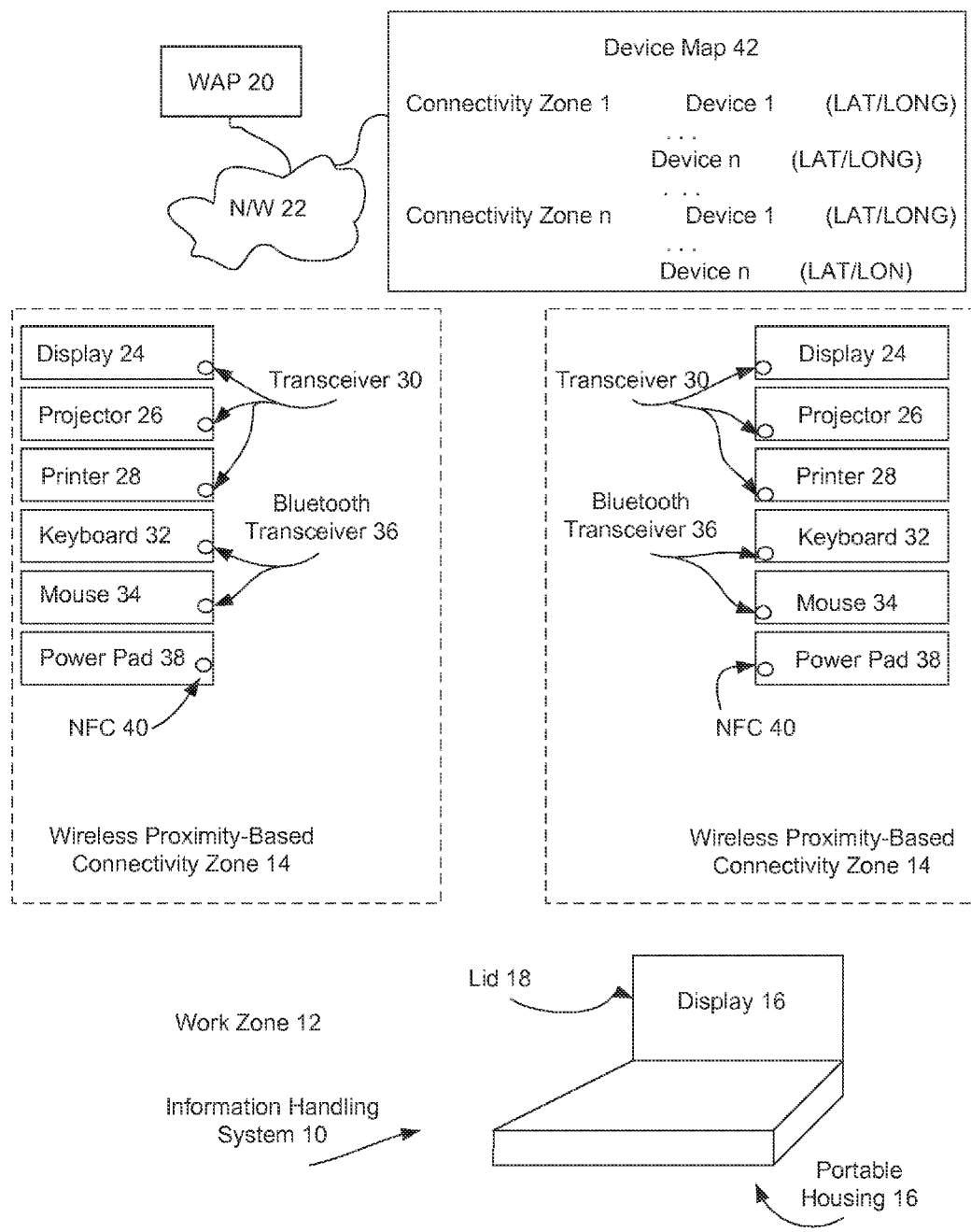
FIG. 1 depicts a block diagram of an information handling system interfaced with plural wireless devices in a work zone that encompasses a wireless proximity-based connectivity.

Referring now to FIG. 1, a block diagram depicts an information handling system 10 interfaced with plural wireless devices in a work zone 12 that provides a wireless proximity-based connectivity station of devices and peripherals 14. In the depicted embodiment, information handling system 10 is a portable information handling system having a portable housing 16 that contains processing components for processing information and a display 16 disposed in a rotationally hinged lid 18. In alternative embodiments, alternative types of information handling systems and housings may be used, such as tablet information handling systems having a fixed housing with an integrated display or mobile telephones configured to act as a telephone handset. Information handling system 10 includes a wireless communication subsystem that provides wireless communication through plural bands, such as through a 2.4 Ghz band in conformance with standard Bluetooth and 802.11(b), a 5.0 Ghz band in conformance with standard 802.11(n), through a 60 Ghz band in conformance with 802.11(ad), through a near field communication band (NFC), and/or a wireless telephone band. The wireless communication subsystem of information handling system 10 includes logic running on a processor that automatically pairs wireless devices with each other based on a user defined policy so that information handling system 10 establishes wireless communication with wireless devices based upon the relative physical location of the wireless devices, such as the proximity of the wireless devices to each other and to information handling system 10.

Wireless proximity-based connectivity station 14 is, for example, a cubicle in an office environment, a conference room, a home, a small business, or other type of work zone 12 where an end user information handling system 10 interacts with a plurality of other information handling systems and peripherals. In the example embodiment, wireless proximity-based connectivity station 14 is one of plural proximity-based information handling systems and peripherals connectivity stations 14 defined in an office building that share a common wireless local area network (WLAN) through communication with a wireless access point (WAP) 20. For example, WAP 20 provides an 802.11(n) band wireless interface to a wireless local area network 22 for information handling systems and peripherals at each of plural wireless proximity-based connectivity stations 14. Within each wireless proximity-based connectivity station 14 plural wireless devices are disposed for use by information handling system 10 through a wireless personal area network interface, such as through wireless communication with 802.11(ad) band interface or other similar bands For example, a display 24, projector 26 and printer 28 each include 60 Ghz transceiver 30 that provides 802.11(ad) communication. As another example, a keyboard 32 and mouse 34 each include a Bluetooth transceiver 36. As another example, a wireless power pad 38 includes a NFC transceiver 40. When interacting with plural peripherals and WLAN 22, information handling system 10 operates in plural wireless bands to emulate wired connections, such as might be provided by a docking station that physically connects to a docking connector of information handling system 10; however, by providing wireless interfaces instead of physical connections, wireless proximity-based connectivity station 14 enhances the convenience of the end user and mobility of the information handling system 10 since bulky connectors and cables are not needed.

In order to provide an end user of information handling system 10 with the usage model of a physically-connected docking station through wireless interfaces, a device map 42 provides a list of wireless devices having position information and pairings so that information handling system 10 can automatically discover and pair wireless devices that use different wireless bands via a user defined policy. The operation of wireless bands is selectively controlled based upon the relative proximity of wireless devices to information handling system 10 so that wireless transceivers of information handling system 10 save power in a powered down state until a selected or paired wireless device is within range of the wireless transceiver. The list of wireless devices in device map 42 is, for example, downloaded through WLAN 22 to information handling system 10 for use by a wireless communication subsystem of information handling system 10. Alternatively, information handling system 10 builds its own list based upon interactions with wireless devices over time, such as by downloading positional information from wireless devices when an interface is established with the wireless devices. Once a list of wireless devices is saved on information handling system 10, an end user can tailor the list manually so that wireless interfaces are established with wireless devices as desired by the end user.

In one example embodiment, an end user enters a work zone 12 having plural wireless proximity-based connectivity stations 14 carrying a portable information handling system 10. Portable information handling system 10 includes a device map 42 that stores a set of wireless devices associated with a wireless proximity-based connectivity station of the end user and the positions of the wireless devices. As the end user comes into range of WAP 20, information handling system 10 detects a GPS position associated with the range of WAP 20 and, in response to detecting being in a position within range of WAP 20, brings a wireless transceiver for communicating with WAP 20 from a power down state to a power up state to initiate a wireless interface between the wireless transceiver and WAP 20. For instance, information handling system 10 is a wireless "smart phone" telephone that automatically transitions from the use of a telephone wireless wide area network (WWAN) interface to a WLAN interface based upon a GPS determination of being in range with WAP 20. As the end user walks close to wireless proximity-based connectivity station 14, information handling system 10 powers up an 802.11(ad) transceiver associated in device map 42 with the end user. For instance, the 802.11(ad) transceiver remains in a powered down state until a GPS position of information handling system 10 indicates that one or more 802.11(ad) wireless devices is within range, such as display 24, projector 26 and printer 28. As the end user comes within physical proximity of wireless connectivity station 14, such as position in which the end user can use keyboard 32 and mouse 34, a wireless Bluetooth transceiver of information handling system 10 powers up from a powered down state to establish an interface with keyboard 32 and mouse 34. In a similar manner, when the end user leaves wireless connectivity 14, wireless transceivers of information handling system 10 enter a power down state as the distance from wireless connectivity station 14 increases. In alternative embodiments, alternative techniques are used to detect the position of information handling system 10 relative to wireless devices. For example, a Bluetooth pairing event or NFC pairing event initiates a power up of an 802.11(ad) 60 Ghz transceiver of information handling system 10 so that a wireless display interface is automatically established in response to a Bluetooth keyboard interface or a power pad interface. For instance, if an end user places a smart phone on power pad 38 to wirelessly recharge the smartphone, an NFC communication between the smartphone and power pad 38 automatically powers up a 60 Ghz transceiver of the smart phone to present images at display 24.

Figure 2:
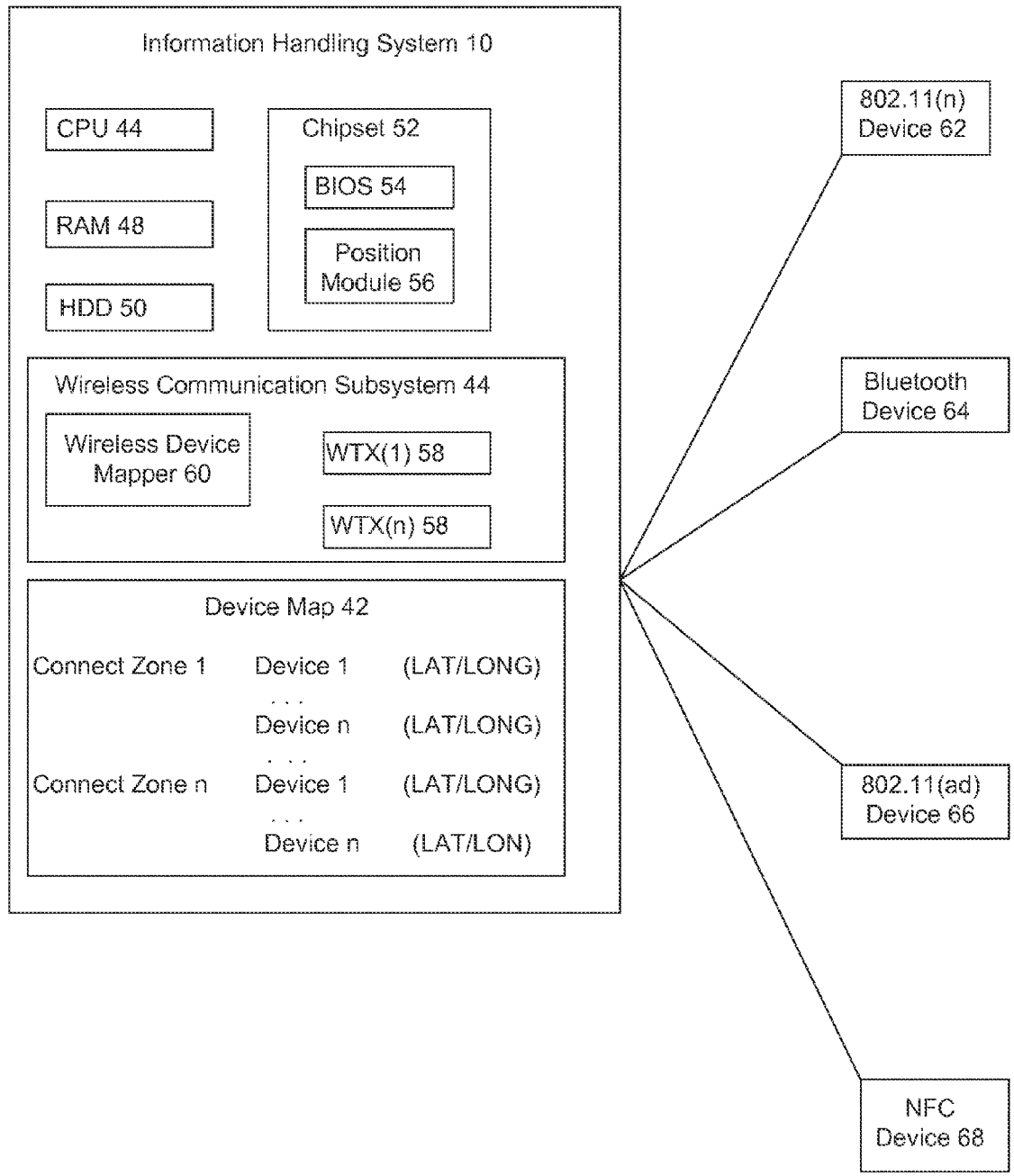
FIG. 2 depicts a block diagram of an information handling system having a wireless communication subsystem that provides automated wireless connectivity for an information handling system through plural wireless communication bands.

Referring now to FIG. 2, a block diagram depicts an information handling system 10 having a wireless communication subsystem 44 that provides automated wireless connectivity for information handling system 10 through plural wireless communication bands. Information handling system 10 processes information by executing instructions on a processor 46 that are stored in RAM 48 and a hard disk drive 50. A chipset 52 includes processing resources that run firmware, such as a BIOS 54, to coordinate communication of information between processor 46, memory, wireless communication subsystem 44 and other components. Chipset 52 includes various resources to display and communication information. In the example embodiment, a position module 56 of chipset 52 determines a physical position of information handling system 10. For example, position module 56 is a GPS receiver that provides a latitude and longitude for information handling system 10. In alternative embodiments, position module 56 determines a position in alternative ways, such as by triangulating between wireless device, measuring wireless device signal strength and retrieving position information from a wireless device, such as by coming into proximity with a NFC.

Wireless communication subsystem 44 includes plural transceivers 58 to communicate wireless signals over plural bands. For example, a wireless transceiver 58 is included in wireless communication subsystem 44 for each of an 802.11 (b) band, 802.11(n) band, 802.11(ad) band, Bluetooth band and NFC band. A wireless device mapper 60 of wireless communication subsystem 44 interfaces with wireless transceivers 58 and wireless device map 42 to determine wireless devices for each wireless transceiver 58 to communicate with based upon a position of information handling system 10 and positions of wireless devices listed in wireless device map 42. For example, wireless device mapper 60 retrieves wireless device map 42 from a network location through an 802.11(n) interface and compares the position of information handling system 10 with the position of nearby wireless connectivity stations or peripheral devices defined by wireless device map 42. Once information handling system 10 is within a defined range of a docking station, wireless device mapper 60 authorizes power up of wireless transceivers 58 associated with wireless devices of the connectivity station to automatically establish wireless interfaces with each of the wireless devices. For example, for an end user, the experience is similar to inserting information handling system 10 into a wired docking station that automatically interfaces with a display and keyboard, however, wireless device mapper 60 establishes the display interface with a wireless 802.11(ad) wireless communication and the keyboard interface with a Bluetooth wireless communication. By selectively powering down transceivers 58 until information handling system 10 is within range of associated wireless devices, power consumption of information handling system 10 will be reduced. Retrieving device map 42 from a WAP having a relatively long range allows shorter range wireless transceivers 58 to remain powered down until within a predetermined proximity of wireless devices that are of interest to an end user, such as the end user's own work space, reducing the need to discover wireless devices that are not relevant to the end user. Similarly, wireless device mapper 60 can create a device map 42 based on the end user's historical use so that each transceiver 58 powers up as position module 56 provides position information indicating that wireless devices of interest to the end user are within range of information handling system 10. Once a wireless transceiver 58 powers up, discovery of wireless devices includes retrieval of device identifiers so that an interface is established with the wireless device of interest by comparing the device identifier retrieved from the wireless devices to the device identifier of device map 42.

In the example embodiment depicted by FIG. 2, an 802.11(n) device 62, a Bluetooth device 64, an 802.11(ad) device 66 and a NFC device 68 are available to interface with information handling system 10. In the example embodiment, wireless device mapper 60 determines whether device 62 is within range by comparing the relative physical location between the latitude and longitude of device 62 listed in device map 42 and the latitude and longitude provided by a GPS device within information handling system 10. Wireless device mapper 60 determines a distance to device 64 by analyzing the Bluetooth relative signal strength, such as by comparing the Bluetooth transmit strength and the received Bluetooth signal strength detected at the information handling system. Wireless device mapper 60 determines a distance to device 66 by comparing the transmit beacon strength sent from device 66 with the signal strength detected at information handling system 10. Wireless device mapper 60 determines that device 68 has the same position as information handling system 10 if an NFC signal is detected. Once a relative position is known to a wireless device, device mapper 60 creates device map 42 and applies the information from device map 42 to automatically establish a wireless proximity-based connectivity station. As an example, if an information handling system powers up over top of a wireless power pad, wireless device mapper 60 detects the NFC of the wireless power pad and automatically establishes network interfaces with wireless devices associated with the wireless power pad in device map 42, such as a display, printer, WAP, etc. . . . associated with a work zone wireless connectivity station. Operation of wireless bands based upon proximity provides reduced power consumption by selectively powering up and powering down wireless transceivers, thus conserving power and wireless bandwidth for other devices. Retrieving physical positions from wireless devices and saving the physical positions in memory of an information handling system is association with device identifiers allows an information handling system to create its own map of wireless devices of interest to an end user or to retrieve a map from wireless device to which the information handling system interfaces. For example, a 60 Ghz wireless transceiver of an information handling system activates to a power up state only when in a proximity to a previously paired device, in essence mimicking a cable-based docking station to conserve power consumption by wireless transceivers. End users can define their own wireless connectivity stations by defining which wireless devices are associated with each other, such as in the same home, office or table, so that the associated wireless devices initiate connections at substantially the same time as if the information handling system inserted into a wired docking station. Interactions with one band can be set to automatically establish interactions through other bands, such as having a NFC interaction as the indicator for an information handling system to power up Bluetooth and 802.11(ad) transceivers to initiate connections with a keyboard and mouse.

Figure 3:
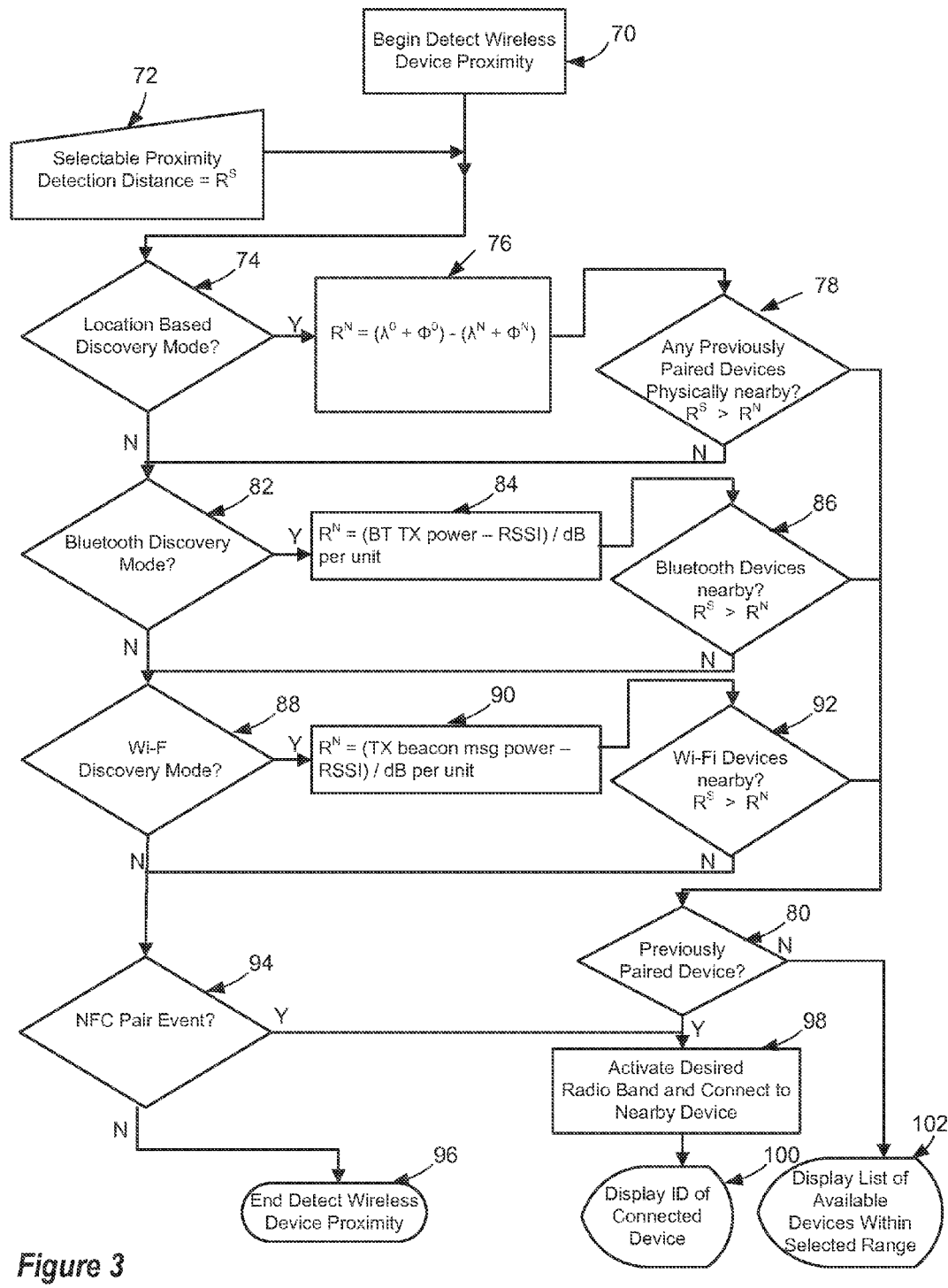
FIG. 3 depicts a flow diagram of a process for proximity-based wireless connectivity through one or more wireless communication bands.

Referring now to FIG. 3, a flow diagram depicts a process for proximity-based wireless docking through one or more wireless communication bands. The process starts at step 70 to detect wireless devices for establishing interfaces based on proximity. At step 72, settings are determined for proximity values to establish wireless interfaces, such as by retrieval of proximity values for each of plural devices that communicate through plural bands from local or network storage. At step 74 a determination is made of whether to perform a location based discovery of wireless devices. If yes, the process continues to step 76 to determine relative position of the information handling system to one or more wireless devices, such as by comparing a GPS detected position with saved position values for the one or more wireless devices. At step 78, a determination is made of whether any previously paired wireless devices are within the relative position. If so, the process continues to step 80 determine whether to establish a wireless interface with the previously-paired wireless device. If at step 78 no previously paired wireless devices are within range or at step 74 the location based discovery is not available, the process continues to step 82.

At step 82, a determination is made of whether a Bluetooth discovery mode is available. If yes, the process continues to step 84 to power on a Bluetooth transceiver and compare the received signal strength of Bluetooth devices with the Bluetooth transmit signal strength to determine the range to the Bluetooth devices. At step 86, a determination is made of whether any detected Bluetooth devices are in range. If so, the process continues to step 80 to determine if the detected and in-range Bluetooth devices were previously-paired to the information handling system. If at step 86 not Bluetooth devices are in range or at step 82 the Bluetooth discovery mode is not available, the process continues to step 88 to determine whether a Wi-Fi discovery mode is available. If so, the process continues to step 90 to determine the range between discovered Wi-Fi devices and the information handling system, such as by comparing the beacon strength and received signal strength of 802.11(b, n, and ad) devices. At step 92, a determination is made of whether any Wi-Fi devices are within range of the information handling system. If at step 92 no Wi-Fi devices are in range or at step 88 the Wi-Fi discovery mode is not available, the process continues to step 94 to determine if a NFC pairing event is detected, which indicates the position of the information handling system is approximately at the NFC device. If no wireless detection modes are available at step 94, the process ends at step 96.

At step 80, a determination is made of whether a detected wireless device was previously paired with the information handling system. If so, the process continues to step 98 to power up and activate the wireless radio band of the wireless device and to establish a wireless interface. Detection of one wireless paired device can initiate communication with plural wireless devices in plural bands if the detected wireless device is paired to wireless devices of other bands. For example, detection of a wireless local area network can result can result in activation of wireless transceivers for bands of other wireless devices paired to the wireless local area network, such as wireless devices of a wireless proximity-based docking station associated with the end user. At step 100, the identifiers of the connected wireless devices are presented at the information handling system. If at step 80 none of the detected wireless devices are previously paired with the information handling system, the process continues to step 102 to present available devices for an end user to select. In one embodiment, the wireless devices are presented in sets organized by wireless docking stations so that an end user can select a wireless docking station to automatically interface with all of the wireless devices in the set.

Although the present invention has been described in detail, it should be understood that various changes, substitutions and alterations can be made hereto without departing from the spirit and scope of the invention as defined by the appended claims.

What is claimed is:

1. An information handling system comprising:
   a housing;
   a processor disposed in the housing and operable to process information;
   a memory disposed in the housing and interfaced with the processor to store information;
   a first wireless transceiver disposed in the housing and interfaced with the processor, the first wireless transceiver operable to communicate information over a first band including at least information through a wireless local area network;
   a second wireless transceiver disposed in the housing and interfaced with the processor, the second wireless transceiver operable to communicate information over a second band including at least peripheral device information associated with peripheral devices that are external to the housing; and
   a wireless device mapper interfaced with the first and second wireless transceivers and operable to determine a first interface by the first wireless transceiver with a first wireless device through the first band and to apply information associated with the first interface to operate the second wireless transceiver in a predetermined manner, the information associated with the first interface including at least a map of the physical distance between the second wireless transceiver and the first wireless transceiver, the map downloaded from the wireless local area network with the first wireless transceiver, the wireless device mapper establishing communication with peripheral devices through the second wireless transceiver when the map indicates a predetermined range and powering down the second wireless transceiver when peripheral devices are outside the predetermined range;
   wherein the wireless device mapper presents a visual image at a display of the relative positions of the peripheral devices to the housing, the peripherals selectable through the visual image to establish a wireless interface with the second wireless transceiver, the peripherals organized as plural sets of plural peripherals, each set defined as a wireless proximity-based connectivity station.

2. The information handling system of claim 1 wherein the predetermined manner comprises a power down of the second wireless transceiver to a power down state.

3. The information handling system of claim 2 wherein the predetermined manner comprises a power up of the second wireless transceiver from a power down state based at least in part upon the position of the housing relative to the first wireless device.

4. The information handling system of claim 3 wherein the first wireless device comprises a wireless access point providing a local area network access and the position of the housing comprises at least a predetermined proximity of the housing to a second wireless device operable to communicate with the second transceiver through the second band.

5. The information handling system of claim 1 wherein the predetermined manner comprises selecting a second wireless device to communicate with the second wireless transceiver from plural wireless devices.

6. The information handling system of claim 5 wherein the information associated with the first interface comprises a position of the housing relative to the first wireless device.

7. The information handling system of claim 6 wherein the information associated with the first interface comprises positions of the plural wireless devices relative to the first wireless device.

8. The information handling system of claim 1 wherein the wireless device mapper operates the second wireless transceiver by interfacing with a selected of plural wireless devices based at least in part on a position of the housing relative to the plural wireless devices.

9. The information handling system of claim 8 further comprising a position module interfaced with the wireless device mapper and operable to determine the position of the housing.

10. The information handling system of claim 9 wherein the wireless device mapper is further operable to retrieve positions of the plural wireless devices through the first interface.

11. A method for managing one or more wireless transceivers disposed in an information handling system, the method comprising:
   placing a wireless personal area network transceiver of the information handling system in a power down state, the wireless personal area network transceiver configured to interact directly with peripheral devices;
   determining that the information handling system is within a predetermined distance of a wireless device having a wireless personal area network, the determining performed at least in part by downloading a map through a wireless local area network access point, the map having physical locations of wireless personal area network peripheral devices relative to the wireless local area network access point, the wireless personal area network peripheral devices organized as plural sets of plural peripheral, each set disposed in a wireless proximity-based connectivity station;
   presenting the map of the physical location of the peripheral device relative to the information handling system at a display of the information handling system, the map providing a user interface for selection of a wireless connection with the peripheral devices by an end user; and
   establishing a wireless interface between the wireless device and the wireless personal area network transceivers of the connectivity station in response to a user selection at the map user interface to interface the information handling system with the peripheral devices.

12. The method of claim 11 further comprising selecting the wireless device from plural wireless devices based upon one or more predetermined conditions.

13. The method of claim 12 wherein the one or more predetermined conditions comprises an identifier of the wireless device.

14. The method of claim 11 wherein determining that the information handling system is within a predetermined distance of a wireless device further comprises:
   determining a position of the information handling system with a GPS receiver disposed in the information handling system; and
   comparing the position of the information handling system with a position of the wireless device to determine a distance between the information handling system and the wireless device.

15. The method of claim 11 wherein determining that the information handling system is within a predetermined distance of a wireless device further comprises:

determining a position of the information handling system with a second wireless transceiver of the information handling system disposed in the information handling system, the second wireless transceiver communicating through a wireless network with wireless device; and retrieving from the wireless device through the wireless network the identity of one or more wireless devices within the predetermined distance.

16. The method of claim 15 wherein the wireless transceiver and the second wireless transceiver communicate through different wireless bands.

* * * * *